(12) United States Patent
Kasavala et al.

(10) Patent No.: US 11,674,907 B2
(45) Date of Patent: Jun. 13, 2023

(54) METHOD AND DEVICE FOR RECOGNISING AND ANALYSING SURFACE DEFECTS IN THREE-DIMENSIONAL OBJECTS HAVING A REFLECTIVE SURFACE, IN PARTICULAR MOTOR VEHICLE BODIES

(71) Applicants: Dhruv Kasavala, Oberschleissheim (DE); Sarma Aryasomayajula, Garching b. Munich (DE)

(72) Inventors: Dhruv Kasavala, Oberschleissheim (DE); Sarma Aryasomayajula, Garching b. Munich (DE)

( * ) Notice: Subject to any disclaimer, the term of this patent is extended or adjusted under 35 U.S.C. 154(b) by 142 days.

(21) Appl. No.: 17/260,677

(22) PCT Filed: Jul. 15, 2019

(86) PCT No.: PCT/DE2019/100655
§ 371 (c)(1),
(2) Date: Jan. 15, 2021

(87) PCT Pub. No.: WO2020/025086
PCT Pub. Date: Feb. 6, 2020

(65) Prior Publication Data
US 2021/0325313 A1    Oct. 21, 2021

(30) Foreign Application Priority Data
Jul. 31, 2018    (DE) .......................... 102018118602.9

(51) Int. Cl.
*G01N 21/88*    (2006.01)
*G06T 7/13*    (2017.01)
(Continued)

(52) U.S. Cl.
CPC ....... *G01N 21/8806* (2013.01); *G01B 11/254* (2013.01); *G01B 11/2513* (2013.01);
(Continued)

(58) Field of Classification Search
CPC ...... G01B 11/24; G01B 17/025; G01B 17/02; G01B 11/30; G01B 11/303; G01B 11/22;
(Continued)

(56) References Cited

U.S. PATENT DOCUMENTS 4,863,268 A    9/1989 Clarke et al.
4,918,321 A    4/1990 Klenk et al.
(Continued)

FOREIGN PATENT DOCUMENTS

CN    102169095 A  *  8/2011    ......... G01B 11/2513
DE       3021448 A1    12/1981
(Continued)

*Primary Examiner* — Michael P Stafira
(74) *Attorney, Agent, or Firm* — Laurence A. Greenberg; Werner H. Stemer; Ralph E. Locher

(57) ABSTRACT

A method and device recognize and analyze surface defects in three-dimensional objects having a reflective surface, in particular motor vehicle bodies. In which method the surface defects are identified by the evaluation of an image, recorded by a camera in the form of a raster image of pixels, of an illumination pattern projected by a first illumination device onto a part of the reflective surface using a two-dimensional raster coordinate system. The surface defects are identified exclusively using two-dimensional image information with the aid of image processing algorithms without the need for "environmental parameters", and complex geometric calculations can be omitted. The solution is fast and robust and can be carried out using differently configured first illumination devices, which makes it suitable for mobile applications, for example as a hand-held module. It is also made possible for the method to be optimized by a "deep learning" strategy.

17 Claims, 4 Drawing Sheets

(51) Int. Cl.
  *G01B 11/25* (2006.01)
  *G06T 7/00* (2017.01)
(52) U.S. Cl.
  CPC ......... *G01N 21/8851* (2013.01); *G06T 7/001* (2013.01); *G06T 7/13* (2017.01); *G01N 2021/888* (2013.01); *G01N 2021/8809* (2013.01); *G01N 2021/8825* (2013.01); *G06T 2207/30204* (2013.01); *G06T 2207/30252* (2013.01)
(58) Field of Classification Search
  CPC .... G01B 7/105; G01B 11/00; G01B 11/2755; G01B 2210/26; G01B 2210/12; G01B 2210/30; G01B 5/0025; G01B 11/16; G01B 2210/143; G01B 11/2513; G01B 9/0268; G01B 11/25; G01B 11/275; G01B 11/2518; G01B 11/0666; G01B 11/26; G01B 9/0205; G01B 11/306; G01B 17/08; G01B 11/02; G01B 11/06; G01B 11/0616; G01B 11/14; G01B 11/245; G01B 17/06; G01B 21/00; G01B 21/20; G01B 11/002; G01B 7/30; G01B 2210/303; G01B 11/026; G01B 11/0608; G01B 11/105; G01B 11/2433; G01B 17/04; G01B 7/282; G01B 11/08; G01B 5/0002; G01B 11/2522; G01B 11/254; G01B 5/06; G01B 5/20; G01B 11/12; G01B 11/2545; G01B 15/00; G01B 21/22; G01B 21/30; G01B 21/32; G01B 11/165; G01B 17/00; G01B 21/26; G01B 2210/14; G01B 5/0028; G01B 5/18; G01B 5/255; G01B 7/13; G01B 9/02049; G01B 11/2527; G01B 2210/146; G01B 2210/283; G01B 5/30; G01B 7/003; G01B 9/02091; G01B 11/04; G01B 11/161; G01B 11/2408; G01B 11/27; G01B 2210/22; G01B 2290/35; G01B 2290/40; G01B 2290/60; G01B 5/066; G01B 5/24; G01B 7/281; G01B 9/02064; G01B 9/02067; G01B 9/02094; G01B 9/02098; G01B 11/022; G01B 11/024; G01B 11/03; G01B 11/10; G01B 11/2416; G01B 11/2509; G01B 11/2536; G01B 11/255; G01B 21/02; G01B 21/08; G01B 21/085; G01B 21/18; G01B 21/24; G01B 2210/24; G01B 2210/28; G01B 5/00; G01B 5/02; G01B 5/046; G01B 5/061; G01B 5/10; G01B 5/12; G01B 5/202; G01B 7/06; G01B 7/14; G01B 7/315; G01B 11/0675; G01B 11/2441; G01B 11/272; G01B 11/28; G01B 13/24; G01B 21/047; G01B 21/10; G01B 21/16; G01B 2210/286; G01B 2210/306; G01B 2210/60; G01B 3/02; G01B 3/28; G01B 3/56; G01B 5/0004; G01B 5/0007; G01B 5/003; G01B 5/004; G01B 5/008; G01B 5/08; G01B 5/14; G01B 5/143; G01B 5/16; G01B 5/204; G01B 5/205; G01B 5/245; G01B 5/28; G01B 7/004; G01B 7/008; G01B 7/02; G01B 7/023; G01B 7/10; G01B 7/15; G01B 7/16; G01B 7/285; G01B 7/345; G01B 9/021; G01B 9/02; G01B 11/2504; G01B 2210/56; G01B 9/02043; G01B 9/02032; G01B 9/02057; G01B 9/02072; G01B 9/02087; G06T 2207/10016; G06T 7/60; G06T 2207/10004; G06T 2207/30004; G06T 2207/30241; G06T 2207/30242; G06T 7/0012; G06T 7/246; G06T 7/0004; G06T 7/001; G06T 7/521; G06T 2207/20056; G06T 2207/30164; G06T 2207/20084; G06T 2207/10056; G06T 2207/20081; G06T 2207/30041; G06T 2207/30204; G06T 2207/30252; G06T 5/002; G06T 7/11; G06T 7/13; G06T 15/00; G06T 15/005; G06T 2207/10012; G06T 2207/10028; G06T 2207/10152; G06T 7/136; G06T 1/0014; G06T 17/00; G06T 2200/04; G06T 2207/10048; G06T 2207/20132; G06T 2207/30036; G06T 2207/30108; G06T 2207/30121; G06T 2207/30124; G06T 3/0031; G06T 5/20; G06T 7/00; G06T 7/0006; G06T 7/0014; G06T 7/0016; G06T 7/10; G06T 7/269; G06T 7/32; G06T 7/514; G06T 7/586; G06T 7/80; G06T 7/90; G06T 1/0007; G06T 11/001; G06T 11/203; G06T 19/20; G06T 2207/10032; G06T 2207/10064; G06T 2207/20221; G06T 2207/30148; G06T 2207/30152; G06T 3/40; G06T 5/006; G06T 5/007; G06T 5/50; G06T 7/0002; G06T 7/507; G06T 7/55; G06T 7/593; G06T 7/62; G06T 7/70; G06T 7/74; G06T 7/85; G06T 7/97
  See application file for complete search history.

(56) References Cited

U.S. PATENT DOCUMENTS

| | | | |
|---|---|---|---|
| 5,367,378 | A | 11/1994 | Harding et al. |
| 2013/0057678 | A1 | 3/2013 | Prior Carrillo et al. |
| 2014/0201022 | A1 | 7/2014 | Balzer |
| 2018/0326591 | A1 | 11/2018 | Haeusler |
| 2019/0302030 | A1 * | 10/2019 | Chenvert ............ G01B 11/306 |
| 2022/0178838 | A1 * | 6/2022 | Orzol ................ G01B 11/2522 |

FOREIGN PATENT DOCUMENTS

| | | | | |
|---|---|---|---|---|
| DE | 3712513 | A1 | 11/1988 | |
| DE | 102010015566 | A1 | 10/2011 | |
| DE | 102015119240 | B3 | 3/2017 | |
| DE | 102016006780 | A1 | 12/2017 | |
| EP | 0997201 | B1 | 12/2005 | |
| EP | 3279864 | A1 * | 2/2018 | ............ G01J 1/4257 |
| FR | 3039276 | A1 * | 1/2017 | |
| JP | H109839 | A * | 1/1998 | |
| JP | 2007183225 | A | 7/2007 | |
| WO | WO-9739339 | A1 * | 10/1997 | ......... G01N 21/8806 |
| WO | WO-2011144964 | A1 * | 11/2011 | ......... G01N 21/8806 |
| WO | 2018130421 | A1 | 7/2018 | |
| WO | WO-2018130421 | A1 * | 7/2018 | ......... G01B 11/2513 |
| WO | WO-2021151412 | A1 * | 8/2021 | |

* cited by examiner

ND DEVICE FOR RECOGNISING
METHOD AND DEVICE FOR RECOGNISING AND ANALYSING SURFACE DEFECTS IN THREE-DIMENSIONAL OBJECTS HAVING A REFLECTIVE SURFACE, IN PARTICULAR MOTOR VEHICLE BODIES

BACKGROUND OF THE INVENTION

Field of the Invention

The present invention relates to a method for recognizing and analyzing surface defects in three-dimensional objects having a reflective surface, in particular motor vehicle bodies, and a device for recognizing and analyzing surface defects in three-dimensional objects having a reflective surface, in particular motor vehicle bodies, in particular according to such a method, at least comprising: a first illumination device, in particular an illumination arch or a handheld module, for projecting an illumination pattern on a surface of the object; a camera, activatable by a light barrier in particular, for recording images in the form of a grid graphic made up of pixels; and a control and data analysis unit.

The increase of extreme weather phenomena such as intensive rainfall, severe storms, and strong thunderstorms with massive hailstorms often has the result that the surface of three-dimensional objects, in particular motor vehicles, but also aircraft, which are subjected to these weather phenomena are frequently damaged. If such damage is claimed by the owner with an insurance company, estimators are always employed, who estimate the respective damage and usually classify it manually. This method is time-consuming, costly, and sometimes not very transparent, since the damage classification can in certain circumstances be greatly dependent on the subjective assessments of individual estimators.

Objective, automated methods for damage classification would therefore be desirable, but their development has an array of difficulties to be overcome in automated surface inspection in particular due to the usually reflective (reflecting) surfaces of the objects to be inspected.

In this context, a method and a device for recognizing surface defects in an object, preferably for recognizing paint defects on the surface of a motor vehicle body, is known from DE 37 12 513 A1, in which a light stripe is generated on the surface by means of an illumination system and guided over the object, wherein its relative movement with respect to the surface is recorded step-by-step and used to determine surface defects. DE 10 2010 015 566 A1 moreover discloses a method and system for measuring reflective surfaces, in which multiple patterns are generated on a luminescent surface, which are reflected on the reflective surface and are captured using a sensor surface of a camera, wherein the coordinates of surface points of the inspected surface are determined from the captured measurement data, from the known coordinates of the luminescent surface and sensor surface, and from the distance between sensor surface and/or luminescent surface and at least one support point arranged on the surface. Both methods are based on the "scanning" of the surface of the object to be inspected and subsequent calculation of a point cloud, which is dependent on a relative velocity between object and respective device and/or a distance between device and object and which can then be used for a further surface analysis. These methods are complex in computation and design.

In addition to the above-mentioned prior art, reference is also made to documents DE 10 2016 006 780 A1, DE 10 2015 119 240 B3, U.S. Pat. No 5,367,378 A, and EP 0 997 201 B1.

SUMMARY OF THE INVENTION

Proceeding therefrom, the present invention is based on the object of providing a method improved in comparison to the prior art and an improved device for recognizing and analyzing surface defects in three-dimensional objects having a reflective surface, which are usable quickly, cost-effectively, and in a mobile manner and advantageously enable objective automated damage classification of surface defects, in particular of hail damage on motor vehicle or aircraft bodies.

This object is first achieved by a method for recognizing and analyzing surface defects in three-dimensional objects having a reflective surface, in particular motor vehicle bodies, having the features of the independent method claim, and by a device for carrying out such a method having the features of the independent device claim. Further advantageous embodiments and refinements, which are usable individually or in combination with one another, are the subject matter of the dependent claims.

The method according to the invention is distinguished in that surface defects are identified on the basis of the evaluation of at least one image recorded by at least one camera in the form of a grid graphic made up of pixels of an illumination pattern projected by at least one first illumination unit on at least a part of the surface on the basis of a two-dimensional grid coordinate system; accordingly, the device according to the invention is distinguished in relation to devices forming the generic type in that the control and data analysis unit is designed to identify surface defects on the surface of the object on the basis of one or more images recorded by means of the camera in the form of grid graphics made up of pixels on the basis of a two-dimensional grid coordinate system.

The invention advantageously enables surface defects on the surface of three-dimensional objects having a reflective surface to be identified exclusively on the basis of items of two-dimensional image information with the aid of image processing algorithms. "Environmental parameters," for example, distances between the camera(s) among one another, but also between camera(s) and object and/or its surface, are not required. Moreover, complex geometrical calculations, in particular triangulation calculations, as are regularly applied in the prior art, can advantageously be omitted. The solution according to the invention is thus fast, robust, and can be carried out in cooperation with a whole array of differently designed first illumination units, which predestines it in particular for mobile applications, for example as a handheld module. Advantageous embodiments increase the robustness of the method.

Additional details and further advantages of the invention will be described hereinafter on the basis of preferred exemplary embodiments, to which the present invention is not restricted, however, and in conjunction with the appended drawings.

DETAILED DESCRIPTION OF THE INVENTION

In the following description of preferred embodiments of the present invention, identical reference signs refer to identical or comparable components.

Figure 1:
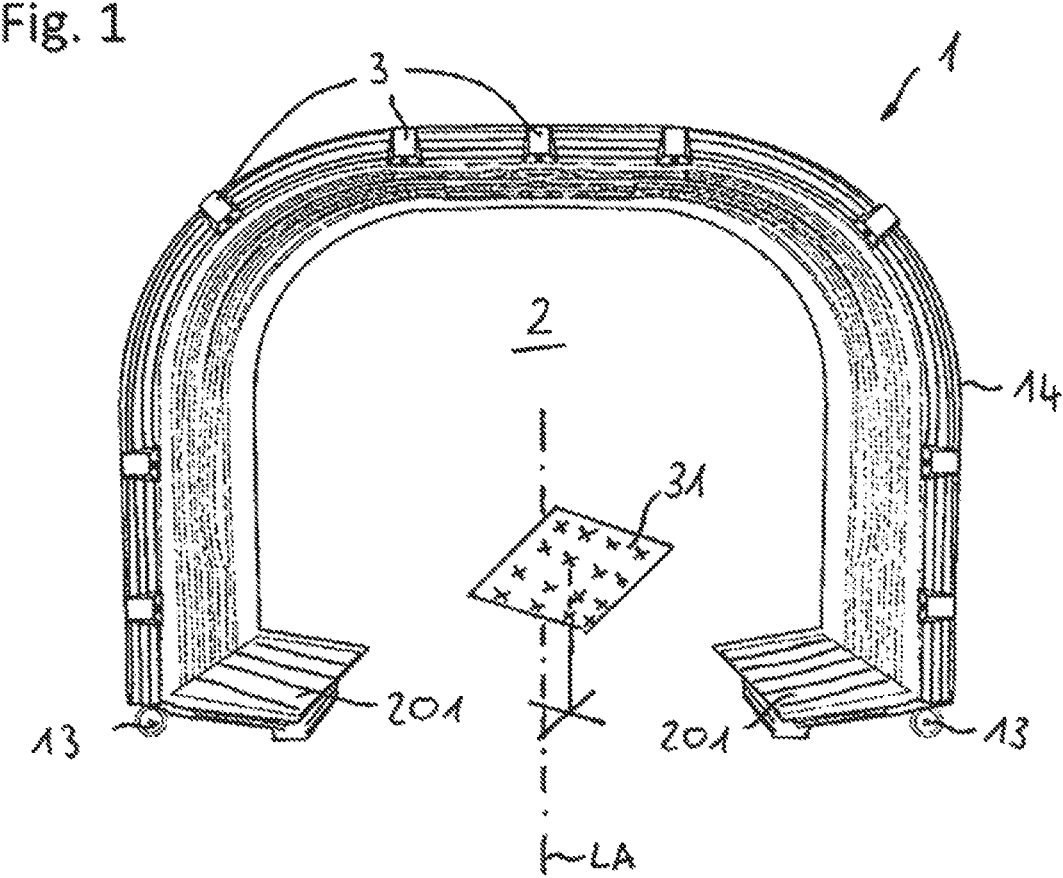
FIG. 1 shows an embodiment of a device according to the invention for recognizing and analyzing surface defects in three-dimensional objects having a reflective surface using a first illumination unit designed as an illumination arch in a perspective view.

FIG. 1 shows an embodiment of a device 1 according to the invention for recognizing and analyzing surface defects OF in three-dimensional objects 5 having a reflective surface 51 using a first illumination unit 2 designed as an illumination arch in a perspective view.

The device 1 according to the invention shown by way of example in FIG. 1 for recognizing and analyzing surface defects OF in three-dimensional objects 5 having a reflective surface 51, in particular motor vehicle bodies, comprises at least one first illumination unit 2 for projecting an illumination pattern 21 onto a surface 51 of the object 5; a camera 3, activatable in particular by a light barrier 11, for recording images in the form of a grid graphic made up of pixels; and a control and data analysis unit 4. It is distinguished in that the control and data analysis unit 4 is designed to identify surface defects OF on the surface 51 of the object 5 on the basis of one or more images recorded by the camera 3 in the form of grid graphics made up of pixels on the basis of a two-dimensional grid coordinate system.

In this case, the first illumination unit 2, as shown here, can be formed by an illumination arch having a frame 14, preferably an aluminum frame. Alternatively thereto, the first illumination unit 2 can also be designed as a handheld module (not shown), which can preferably be formed in the form of a portable lamp, (organic) light-emitting diode (LED/OLED) display, liquid crystal (LCD) display, or plasma display. The illumination pattern 21 generated by the first illumination unit 2 can be generated by a regular shading of a continuous luminescent surface, for example by a correspondingly designed film arranged on the luminescent surface. Alternatively or additionally thereto, the first illumination unit 2 can also be formed by at least one liquid crystal (LCD) display, (organic) light-emitting diode (LED/OLED) display, or plasma display, which is either also shaded in regular sections and thus a desired illumination pattern 21 is generated, or an illumination pattern 21 is projected directly in the form of an image projection onto the surface 51 of a three-dimensional object 5.

The embodiment of the device 1 shown in FIG. 1 comprises, for example, nine cameras 3, which are arranged in particular on the first illumination unit 2, preferably, as shown here, on a frame 14 of a first illumination unit 2 designed as an illumination arch.

Below the first illumination unit 2, in particular the illumination arch, a calibration means 31 is shown by way of example, with the aid of which, preferably during startup of the device 1, a calibration of the one or more cameras 3 can advantageously be performed. A calibration plate having points spaced apart uniformly from one another at known intervals is shown for this purpose by way of example as the calibration means 31 in FIG. 1.

Figure 2:
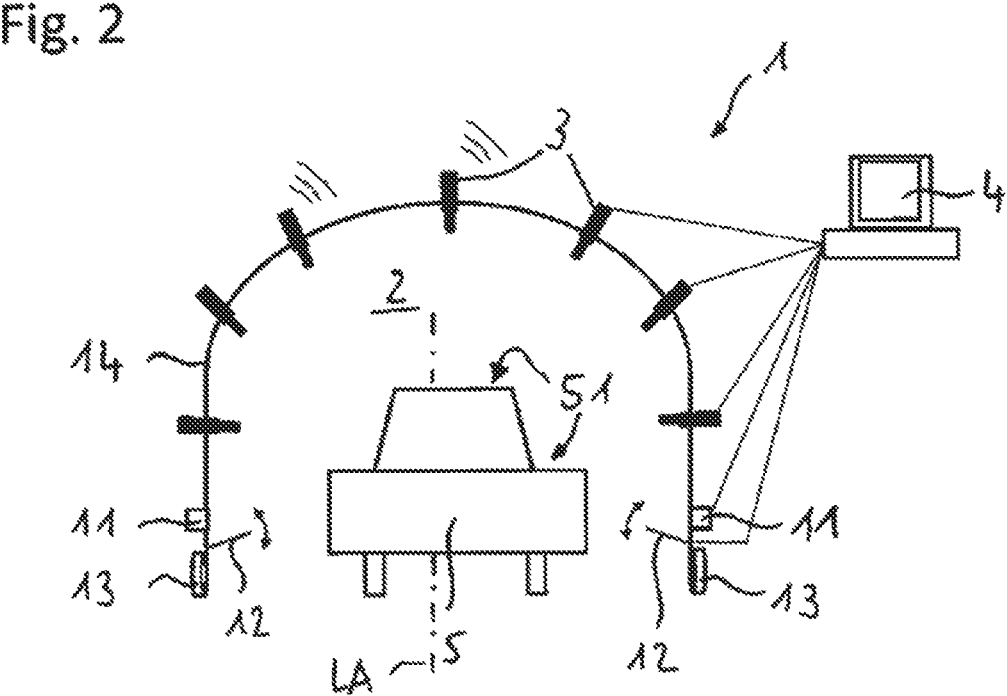
FIG. 2 shows a further embodiment of the device according to the invention having a first illumination unit designed as an illumination arch, and a three-dimensional object to be inspected in a frontal view.

FIG. 2 shows a further embodiment of the device 1 according to the invention having a first illumination unit 2 designed as an illumination arch, and a three-dimensional object 5 to be inspected in a frontal view.

In this embodiment of the device 1, seven cameras 3 are arranged by way of example on the frame 14 of a first illumination unit 2 designed as an illumination arch. As already shown in FIG. 1, the first illumination unit 2 can comprise at least two, preferably four rollers 13 for moving the first illumination unit 2. The provision of rollers 13 on a first illumination unit 2 designed in particular as an illumination arch can advantageously enhance the mobility of the device 1. The device 1 can thus, for example, with the aid of the rollers 13, easily be rolled onto a transport trailer or rolled down from it and set up for use at any location.

In addition, at least one light barrier 11 can advantageously also be provided, which is shown arranged by way of example in FIG. 2 on the frame 14 of the first illumination unit 2 above the rollers 13. With the aid of the light barrier 11, the at least one or more cameras 3 can advantageously be activated, in particular when a three-dimensional object 5, preferably a motor vehicle, is moved through the first illumination unit 2, in particular the electric arch, and passes the light barrier 11 at the same time. The light barrier 11 can accordingly also activate the at least one or more cameras 3, of course, if the three-dimensional object 5 is stationary and the device 1, in particular the first illumination unit 21, moves over the object 5. The movement of the device 1 in relation to the object 5 can advantageously be implemented with respect to the device 1 by the rollers 13 arranged on the first illumination unit 2 and with respect to the three-dimensional object 5, in particular by a motor vehicle, by its own drive including wheels. Alternatively or additionally, however, rails can also be provided, on which the device 1 and/or the three-dimensional object 5 moves. The one or more cameras 3, the first 2 and second 201 illumination unit, and the light barrier 11 can moreover preferably communicate via wires or also wirelessly, for example via a WLAN or Bluetooth connection, with the control and data analysis unit 4.

In addition, it has proven to be effective if the first illumination unit 2, in particular the illumination arch, comprises at least one, preferably—as shown in FIG. 2—two mirrors 12, which are preferably arranged along a longitudinal axis LA adjacent to the floor on the illumination unit 2, wherein the mirror or mirrors 12 are preferably pivotably arranged on the illumination unit 2. Such mirrors 12 advantageously enable the illumination pattern 21 projected by the first illumination unit 2 on the surface 51 of the three-dimensional object 5 advantageously to be projected by reflection also on regions of the surface 51 which are close to the floor and/or curved, and on which an illumination pattern 21 cannot be depicted in the case of direct projection.

Alternatively or additionally, the first illumination unit 2, in particular the illumination arch, can also comprise at least one, preferably two second illumination units 201, which are preferably arranged along a longitudinal axis LA adjacent to the floor on the first illumination unit 2, wherein the at least one second illumination unit 201 is preferably arranged pivotably on the first illumination unit 2 and is designed to project an illumination pattern 21, in particular a stripe pattern, on a surface 51 of the object 5, in particular on the surface 51 of the object 5 close to the floor. The one or more second illumination units 201 can be designed here like the one or more first illumination units 2, thus in the form of a lamp, (organic) light-emitting diodes (LED/OLED), liquid crystal (LCD) displays, or plasma displays and can generate the illumination pattern or patterns 21 as described above. One or more such second illumination units 201 can, like the mirrors 12, advantageously enable an illumination pattern 21 to also be projected on regions of the surface 51 which are close to the floor and/or curved and on which an illumination pattern 21 cannot be imaged in the case of direct projection.

In general, various wavelengths, i.e., various colors up to UV or infrared rays, can be used for the illumination. The type of the one or more cameras 3 used is preferably selected in accordance with the wavelength of the light used, i.e., for example cameras 3 having a CCD detector for visible light, UV light, and/or infrared light.

Figure 3:
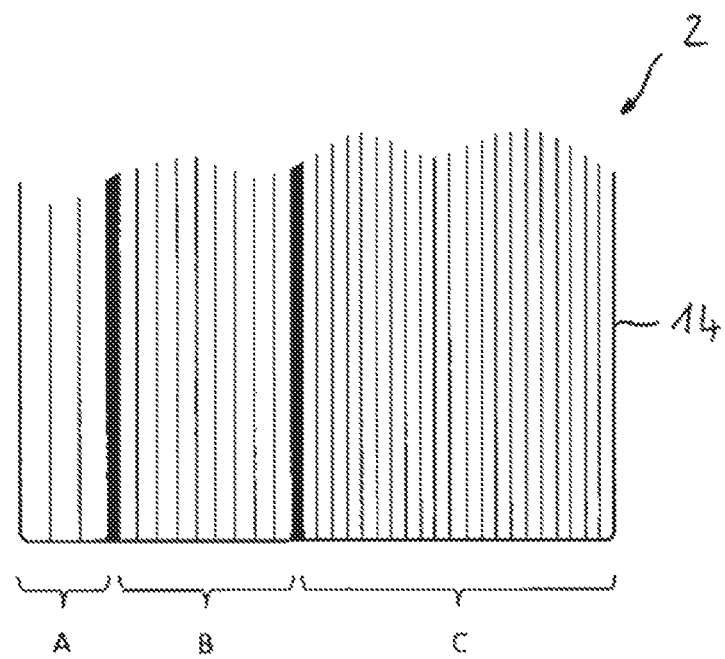
FIG. 3 shows a part of an embodiment of a first illumination unit having three different illumination sections.

FIG. 3 shows a part of an embodiment of a first illumination unit 2 having three different illumination sections A, B, C. The illumination pattern 21 thus generated on the surface 51 of the three-dimensional object 5 accordingly also advantageously has three illumination sections A, B, C, which advantageously differ from one another in the respective stripe width. Illumination patterns 21, in particular stripe patterns having smaller stripe widths, as are generated here, for example, by the illumination sections B and C, are advantageously suitable for recognizing and analyzing surface defects OF having smaller diameter; while in contrast illumination patterns 21, in particular stripe patterns having comparatively greater stripe widths, as are generated in particular by illumination section A, are advantageously suitable for recognizing and analyzing surface defects OF having larger diameter.

Figure 4:
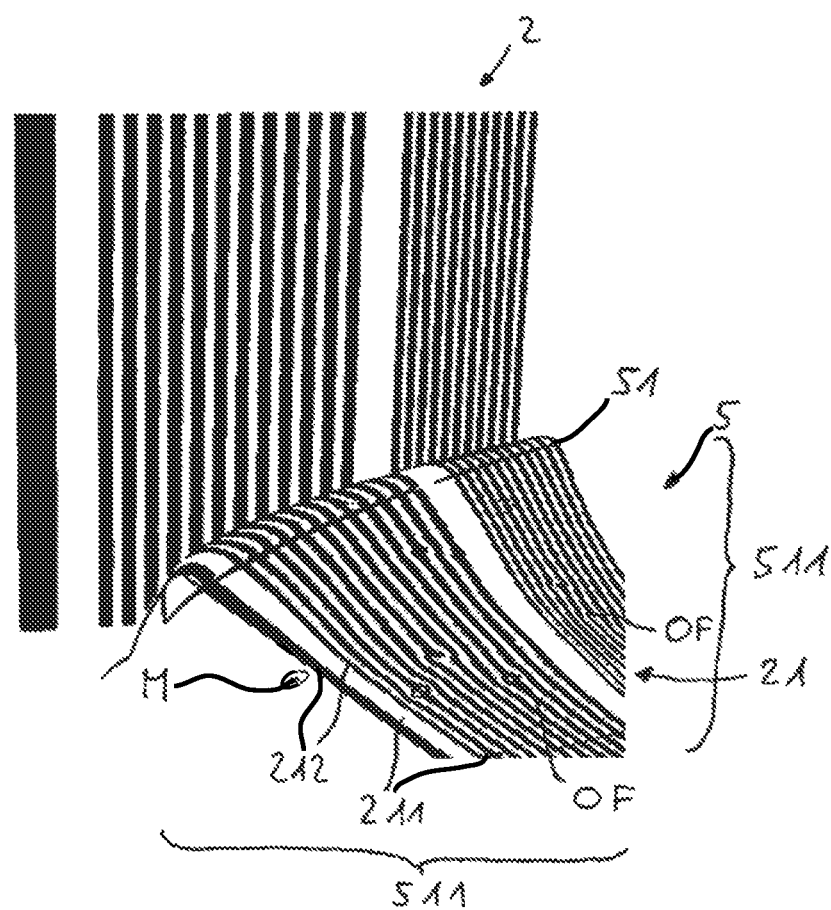
FIG. 4 shows a part of an embodiment of a first illumination unit, and the illumination pattern projected by it on a three-dimensional object, a motor vehicle body here.

FIG. 4 shows a part of an embodiment of a first illumination unit 2, and the illumination pattern 21 projected by it on a three-dimensional object 5, a motor vehicle body here.

Surface defects OF, as shown by way of example in FIG. 4, are now identified by the method according to the invention for recognizing and analyzing surface defects OF in three-dimensional objects 5 having a reflective surface 51, in particular of motor vehicle bodies, on the basis of the evaluation of at least one image recorded by at least one camera 3 in the form of a grid graphic made up of pixels of an illumination pattern 21 projected by at least one first illumination unit 2 on at least a part of the surface 51 on the basis of a two-dimensional grid coordinate system. The illumination pattern 21 can preferably be a stripe pattern, in particular a stripe pattern having a sinusoidal intensity curve, wherein the stripe widths can differ from one another in sections (see illumination sections A, B, C), as already shown in FIG. 3.

In one preferred embodiment of the invention, in a preferred method step, one or more images in the form of grid graphics made up of pixels of at least a part of the surface 51 of the object 5 can advantageously be recorded by means of at least one camera 3. For this purpose, in a further method step, preferably, in particular after a manual or automated configuration of the focus of the one camera 3 or the multiple cameras 3, the (optimum) exposure time of the one camera 3 or the multiple cameras 3 can be determined and configured, in particular by means of a control and data analysis unit 4, on the basis of the color of the surface 51 of the object 5, in particular the color of the motor vehicle body. Moreover, it is advantageous if in one method step the one or more cameras 3 are calibrated with the aid of a calibration means 31, as shown in FIG. 1.

In a further preferred method step, a region 511 of the recorded surface 51 of the object 5, on which the illumination pattern 21 is projected, can now advantageously be identified within the recorded image or images, wherein preferably a two-dimensional grid coordinate system having x and y coordinates for each pixel can preferably be associated with the identified region 511.

Figure 5:
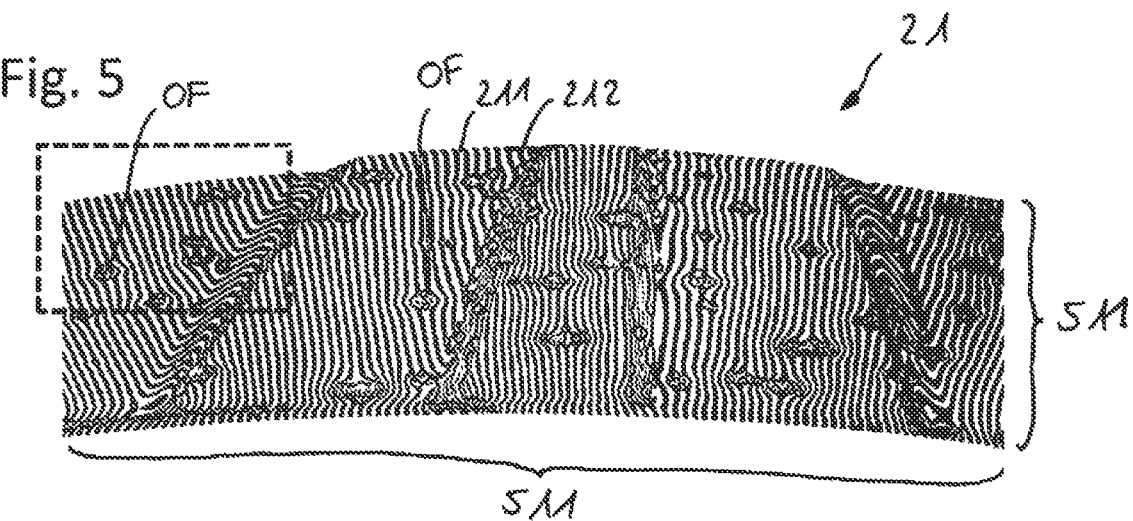
FIG. 5 shows a grid graphic of an identified region of a part of a surface of a three-dimensional object, an engine hood of a motor vehicle here.

FIG. 5 shows by way of example a grid graphic of such an identified region 511 of a part of a surface 51 of a three-dimensional object 5, on the basis of the example of an engine hood of a motor vehicle here.

It can be seen in both figures (FIG. 4 and FIG. 5) how the light stripes 211 and dark stripes 212 of an exemplary illumination pattern 21 stand out on the surface 51 of a three-dimensional object 5, a motor vehicle body here.

Furthermore, it is preferred if in one method step, within an identified region 511, in particular starting from a zero point of the two-dimensional grid coordinate system, intensity values, in particular light-dark values, are assigned to at least a part of the pixels. By means of edge detection, starting from previously defined starting values, at least sections of the illumination pattern 21 projected on the surface 51, in particular the stripes of a stripe pattern, can then be identified in the image or the images, wherein pixels of intensity values which are equal or similar up to a predetermined deviation value, in particular light-dark values, can be identified as associated.

In a further preferred embodiment of the invention, on the basis of a group of pixels identified as associated, a functional (mathematical) relationship, in particular a function graph, can be established for the respective group of pixels identified as associated. The light stripes 211 and dark stripes 212 shown, inter alia, in FIG. 5 can thus advantageously be approximated in the form of mathematical curves, for example as a polynomial or spline. In a further preferred method step of the present invention, for each pixel of a group of pixels identified as associated, the first derivative of a found functional (mathematical) relationship, in particular the slope of a found function graph, can then be determined and in addition in a further preferred method step, at least sections of the illumination pattern 21 projected on the surface 51, in particular the stripes of a stripe pattern can advantageously be classified in the image or the images on the basis of the first derivative of a found functional (mathematical) relationship, in particular on the basis of a slope of the function graph. Three light stripes 211 (horizontally shaded, diagonally shaded, and checked shaded) classified in this way are shown by way of example in FIG. 7, wherein each shading corresponds, for example, to a special slope, preferably within a predetermined region in terms of a "neighborhood analysis".

In addition, it is preferred if in one method step, surface defects OF are identified within the identified region 511 on the basis of characteristic changes and/or a disappearance of the first derivative of a found functional (mathematical)

relationship, in particular the slope of a function graph, in the classified sections, in particular in the stripes of a stripe pattern.

Figure 6:
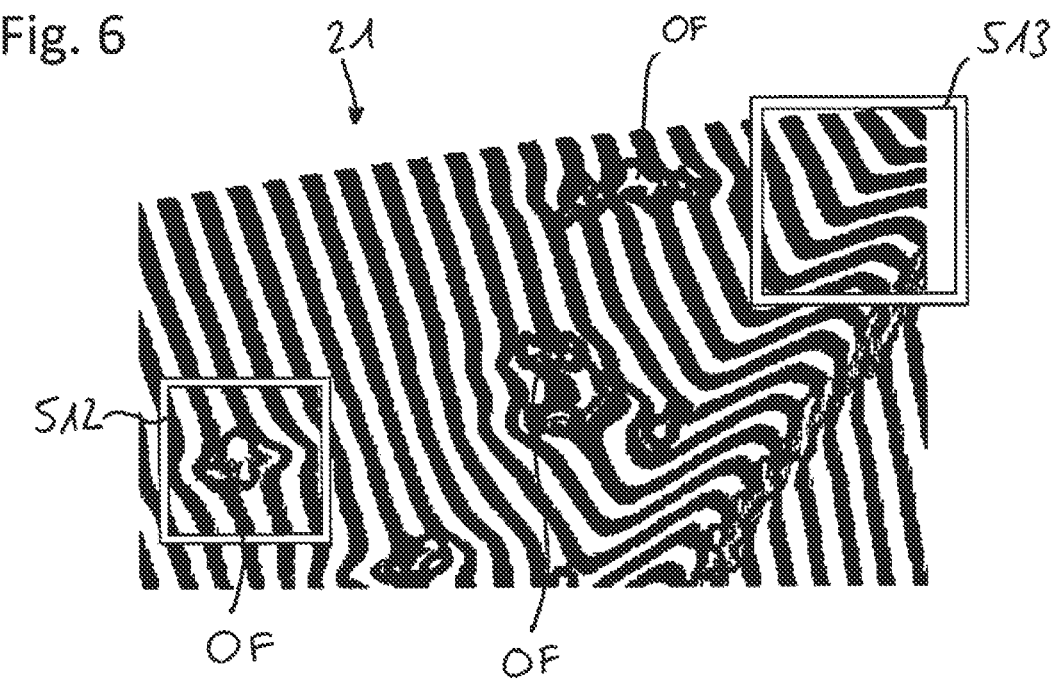
FIG. 6 shows an enlargement of the section of the grid graphic framed by dashed lines in FIG. 5, a region having surface defects (bottom left) and a region without surface defects, but change of the structure of the surface (top right) framed therein.
Figure 7:
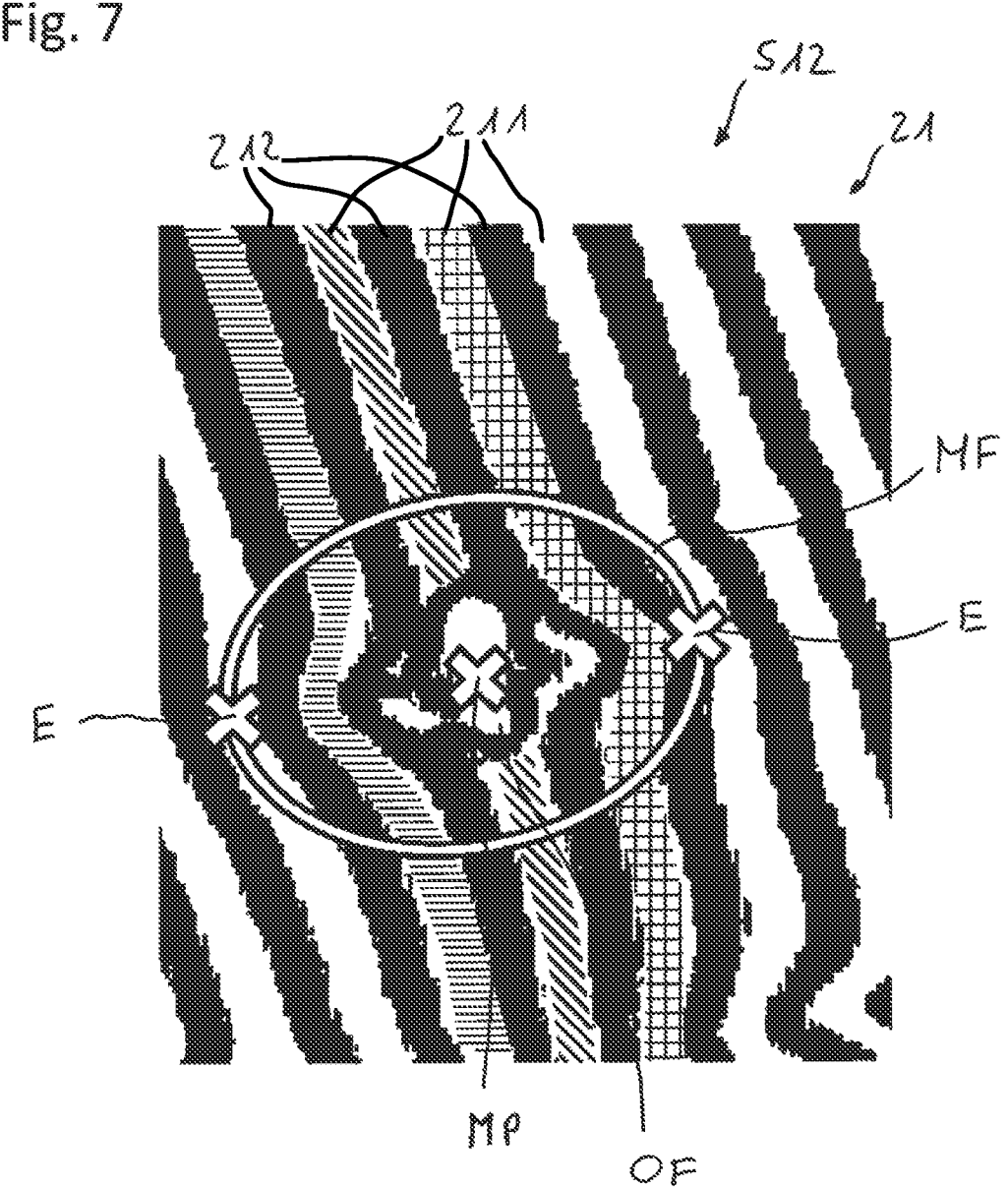
FIG. 7 shows an enlargement of the region shown in FIG. 6 with surface defects (framed bottom left) having an identified and classified surface defect.

FIG. 6 shows for this purpose an enlargement of the section of the grid graphic framed by dashed lines in FIG. 5, and in turn framed therein a region 512 with surface defects OF (bottom left) and a region 513 without surface defects OF, but change of the structure of the surface 51 (top right), wherein FIG. 7 finally shows an enlargement of the region 512 shown in FIG. 6 with surface defects OF (framed bottom left) with an identified and classified surface defect OF.

In FIG. 7, such characteristic changes and/or a disappearance of the first derivative of a found functional (mathematical) relationship can be seen well on the basis of the shaded light stripes 211. In the example illustrated here, the first derivatives, in particular the slopes, of the horizontally shaded and the checked stripe change in a characteristic way in a section of the identified region 511 adjacent to one another, wherein the curves of the horizontally shaded and the checked stripe are opposite to one another. The diagonally shaded light stripe 211 even breaks off completely in an also adjacent section of the identified region 511 located between the two other shaded light stripes 211, the first derivative of a functional (mathematical) relationship found for this purpose accordingly disappears. The disappearance of individual stripes can accordingly advantageously be used as a criterion for identifying surface defects OF.

In contrast thereto, structure changes in the surface 51 of a three-dimensional object 5, for example folds or bends in the engine hood of a motor vehicle body, do not result in such a pattern, in particular do not result in a disappearance of the first derivative of a found functional (mathematical) relationship, in particular the slope of a function graph, and therefore a complete interruption of a light stripe 211, but only, as shown in FIG. 6 in the framed region 513, in similar changes of the first derivative of a found functional (mathematical) relationship, preferably the slope of a function graph, in particular having a similar curve (in the same direction).

In a further preferred method step, the size of individual identified surface defects OF can moreover advantageously preferably be ascertained by determining a center point of the respective surface defect OF and at least one extremum E spaced apart from the center point MP. For this purpose, in particular a model function MF, for example a circle or ellipse function, can be calculated starting from the center point MP and the distance between center point MP and an extremum E as the radius and preferably projected in the respective grid graphic, in order to represent the size of the respective surface defect OF in the image or the images. For this purpose, for example, the maximum or minimum of a found function graph can be used as the extremum E.

In a further preferred embodiment of the invention, in one method step, the at least one illumination unit 2 and/or the at least one camera 3 can be moved in relation to the three-dimensional object (5). Alternatively thereto, the three-dimensional object 5 can also be moved in relation to the at least one illumination unit 2 and/or the at least one camera 3. For example, a motor vehicle can drive through a first illumination unit designed as an illumination arch. Multiple images can then preferably be recorded, in particular multiple images by multiple cameras 3, for recognizing and analyzing surface defects OF in this case. In a further embodiment of the invention, it has proven to be effective if in one method step, at least one marker M, in particular four markers M, are arranged on the surface 51 of the object 5 and the position of the marker or markers M is determined within the recorded image or images. The determination of the position of one or more markers M within various recorded images can advantageously be used, preferably before beginning a further surface analysis, for combining multiple images into a two-dimensional grid coordinate system, in particular if the object 5 to be inspected, or its surface 51, respectively, is larger than the illumination pattern 21 projected on the surface 51 of the object 5. In this case and/or in the case of the relative movement of the object 5 with respect to the device 1 or vice versa, multiple images are advantageously recorded, in particular also by multiple cameras 3, which can then advantageously be combined with one another in a grid coordinate system on the basis of an item of position information of at least one marker M in the various images.

Finally, it is preferred if, in one method step, identified surface defects OF are classified by a comparison to at least one model function MF, in particular to a circle function and/or ellipse function, and/or a pattern of already classified surface defects OF, characteristic changes, and/or a disappearance of the first derivative of an already found functional (mathematic) relationship, and the measurement and/or evaluation data of surface defects OF classified in this way are stored in a database, in particular in a cloud database. Alternatively or additionally thereto, identified surface defects OF can also be classified by a comparison to database entries, in particular to database entries of a database having measurement and/or evaluation data of already classified surface defects OF, and measurement and/or evaluation data of classified surface defects OF are stored in a database, in particular in a cloud database. This advantageously enables the recognition and analysis of surface defects OF in three-dimensional objects 5 having reflective surface 51 to be improved after each performed analysis and the performance of the method according to the invention or the device 1 according to the invention to be optimized automatically in terms of a "deep learning" or "machine learning" strategy.

The present invention relates to a method for recognizing and analyzing surface defects OF in three-dimensional objects 5 having a reflective surface 51, in particular motor vehicle bodies, in which the surface defects OF are identified on the basis of the evaluation of at least one image recorded by at least one camera 3 in the form of a grid graphic made up of pixels of an illumination pattern 21 projected by at least one illumination unit 2 on at least a part of the surface 51 on the basis of a two-dimensional grid coordinate system, and also a device 1 for this purpose. It advantageously enables surface defects OF to be identified exclusively on the basis of items of two-dimensional image information with the aid of image processing algorithms, wherein no "environmental parameters" are required and complex geometrical calculations can advantageously be omitted. The solution according to the invention is thus fast, robust, and can be carried out in cooperation with differently designed first illumination units 2, which predestines it in particular for mobile applications, for example as a handheld module. In addition, optimizing the method according to the invention by way of a "deep-learning" strategy is enabled.

LIST OF REFERENCE SIGNS 1 device
11 light barrier
12 mirror
13 rollers 14 frame
2 first illumination unit
21 illumination pattern
211 light stripe
212 dark stripe
201 second illumination unit
3 camera
31 calibration means
4 control and data analysis unit
5 object, in particular motor vehicle body
51 surface
511 region
512 region with surface defects (OF)
513 region without surface defects (OF), but change of the structure of the surface (51)
A first illumination section
B second illumination section
C third illumination section
LA longitudinal axis
M marker
OF surface defects
MF model function
MP center point
E extremum

The invention claimed is:

1. A method for recognizing and analyzing surface defects in three-dimensional objects having a reflective surface, which comprises the steps of:
    identifying the surface defects on a basis of an evaluation of a single at least one image recorded by at least one camera in a form of a grid graphic made up of pixels of an illumination pattern projected by at least one first illumination unit on at least a part of the reflective surface on a basis of a two-dimensional grid coordinate system;
    identifying a region of a recorded surface of the object, on which the illumination pattern is projected, within the at least one image recorded by the at least one camera, and associating the two-dimensional grid coordinate system having x and y coordinates for each pixel with an identified region;
    within the identified region, assigning intensity values to at least a part of the pixels starting from a zero point of the two-dimensional grid coordinate system;
    identifying, by means of edge detection, starting from previously defined starting values, at least sections of the illumination pattern projected on the reflective surface in the at least one image; and
    identifying as associated the pixels having the intensity values that are equal or similar up to a predetermined deviation value.

2. The method according to claim 1, which further comprises forming the illumination pattern as a stripe pattern.

3. The method according to claim 1, wherein the at least one image in the form of the grid graphic made up of pixels of at least the part of the reflected surface of an object is recorded by means of the at least one camera:
    wherein after a manual or automatic configuration of a focus of the at least one camera or multiple cameras, an optimum exposure time is determined and configured on a basis of a color of the reflective surface of the object; and/or
    wherein the at least one camera or the multiple cameras are calibrated with a aid of a calibration means.

4. The method according to claim 1, wherein on a basis of a group of pixels identified as associated, a mathematical relationship is produced for a respective group of the pixels identified as associated.

5. The method according to claim 4, wherein for each pixel of the group of pixels identified as associated, a first derivative of the mathematical relationship is determined.

6. The method according to claim 5, wherein at least sections of the illumination pattern projected on the reflective surface in the at least one image or images are classified on a basis of the first derivative of the mathematical relationship.

7. The method according to claim 1, wherein the surface defects are identified within the identified region on a basis of characteristic changes and/or a disappearance of a first derivative of a found mathematical relationship in classified sections.

8. The method according to claim 1, wherein a size of an identified individual one of the surface defects is ascertained by determining a center point of a respective surface defect and at least one extremum spaced apart from the center point.

9. The method according to claim 1, which further comprises disposing at least one marker on the reflective surface of the object and a position of the at least one marker is determined within a recorded image or images.

10. The method according to claim 1, wherein:
    the at least one first illumination unit and/or the at least one camera is moved in relation to a three-dimensional object; or
    the three-dimensional object is moved in relation to the at least one first illumination unit and/or the at least one camera.

11. The method according to claim 1, wherein:
    identified surface defects are classified by a comparison to at least one model function, and/or a pattern of already classified surface defects, characteristic changes, and/or a disappearance of a first derivative of an already found mathematical relationship, and a measurement and/or evaluation data of the surface defects classified in such a way are stored in a database; and/or
    the identified surface defects are classified by a comparison to database entries and measurement and/or evaluation data of classified surface defects are stored in the database.

12. The method according to claim 1, wherein the three-dimensional objects are motor vehicle bodies.

13. The method according to claim 2, wherein the stripe pattern has a sinusoidal intensity curve.

14. The method according to claim 3, wherein the optimum exposure time is determined and configured by means of a control and data analysis unit, of the at least one camera or the multiple cameras on the basis of the color of the reflective surface of the object being a color of a motor vehicle body.

15. The method according to claim 1, wherein:
    the intensity values are light-dark values;
    by means of the edge detection, starting from the previously defined starting values, the at least sections of the illumination pattern projected on the reflective surface, namely stripes of a stripe pattern, are identified in the at least one image or the images; and
    the pixels having the light-dark values which are equal or similar up to the predetermined deviation value are identified as associated.

16. A device for recognizing and analyzing surface defects in three-dimensional objects having a reflective surface, the device comprising:

a first illumination unit for projecting an illumination pattern on the reflective surface of an object;

a camera being activatable for recording images in a form of a grid graphic made up of pixels; and a control and data analysis unit configured to identify the surface defects on the reflective surface of the object on a basis of at least one image recorded by means of said camera in the form of the grid graphics made up of the pixels on a basis of a two-dimensional grid coordinate system;

said control and data analysis unit additionally configured to:

identify a region of a recorded surface of the object, on which the illumination pattern is projected, within said at least one image recorded by the at least one camera, and associate said two-dimensional grid coordinate system having x and y coordinates for each pixel with an identified region;

within said identified region, assign intensity values to at least a part of the pixels starting from a zero point of said two-dimensional grid coordinate system;

identify, by means of edge detection, starting from previously defined starting values, at least sections of the illumination pattern projected on the reflective surface in said at least one image; and identify as associated the pixels having the intensity values that are equal or similar up to a predetermined deviation value.

17. The device according to claim 16, wherein:

said first illumination unit is configured as an illumination arch movable on at least two rollers, said first illumination unit having at least one mirror;

said at least one mirror is configured to project by reflection an illumination pattern of said first illumination unit on the reflective surface of the object; and/or said first illumination unit contains at least one second illumination unit, and said at least one second illumination unit is configured to project an illumination pattern on the reflective surface of the object.

* * * * *